March 15, 1949.　　　　　　L. GREAVES　　　　　　2,464,305
ROOT CROP DIGGER
Filed Feb. 15, 1945　　　　　　　　　　　　4 Sheets-Sheet 2
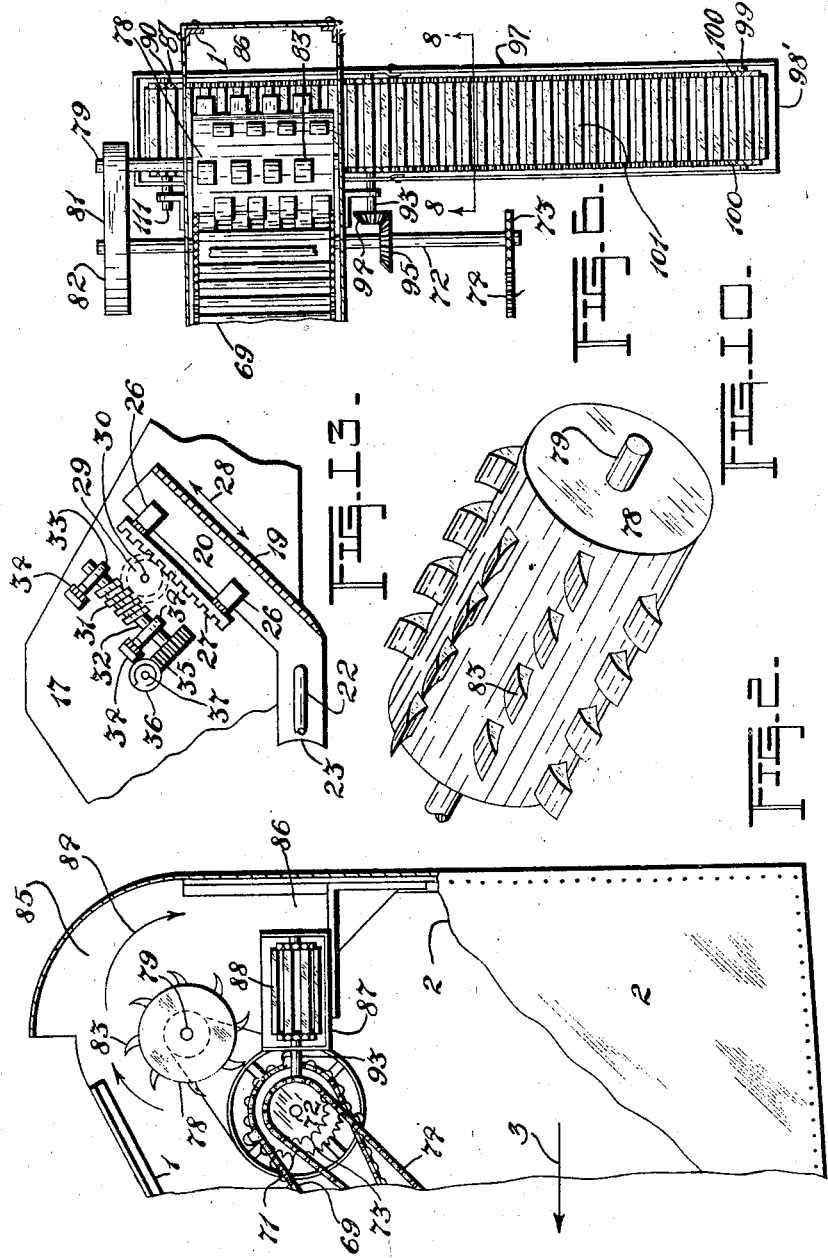
INVENTOR:
Leopold Greaves March 15, 1949.
L. GREAVES
2,464,305
ROOT CROP DIGGER
Filed Feb. 15, 1945
4 Sheets-Sheet 3
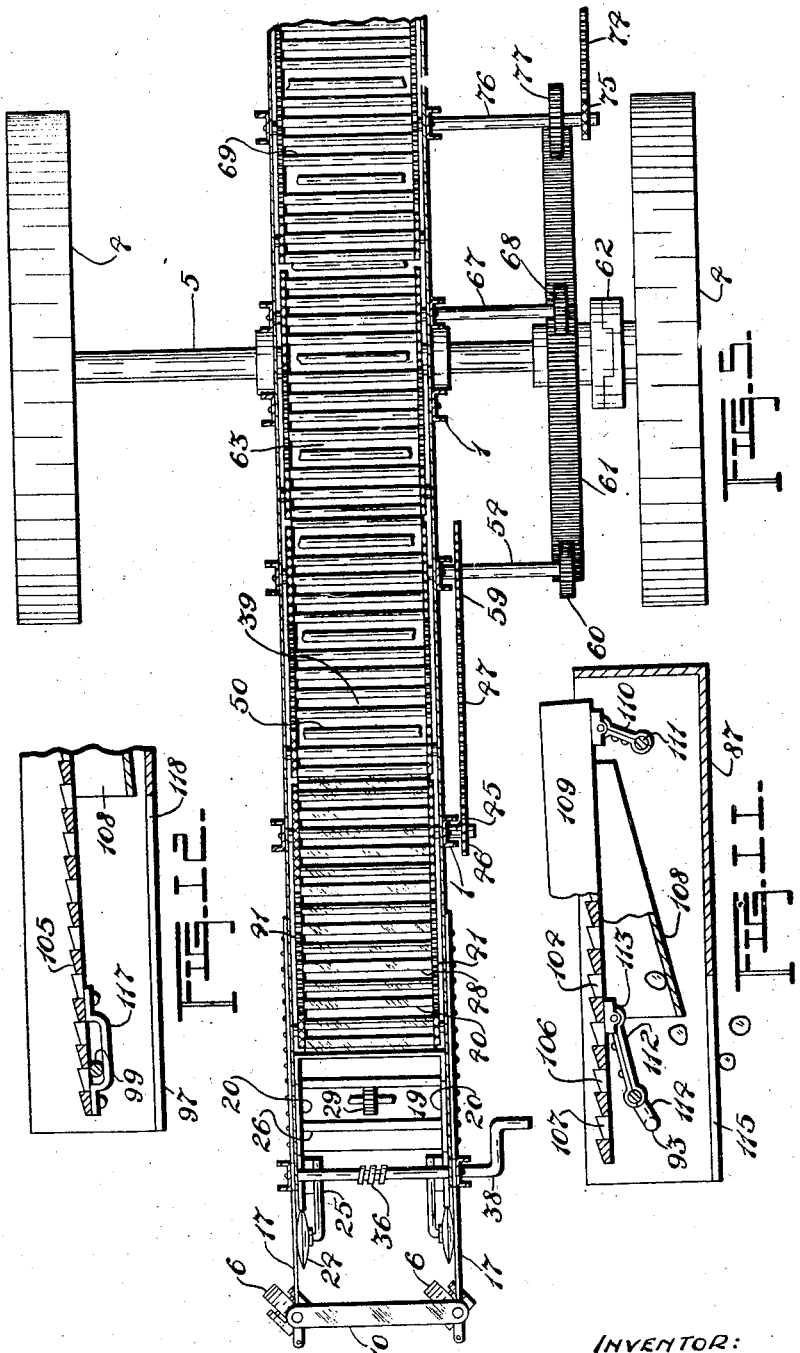
INVENTOR:
Leopold Greaves
BY:
his Attys.

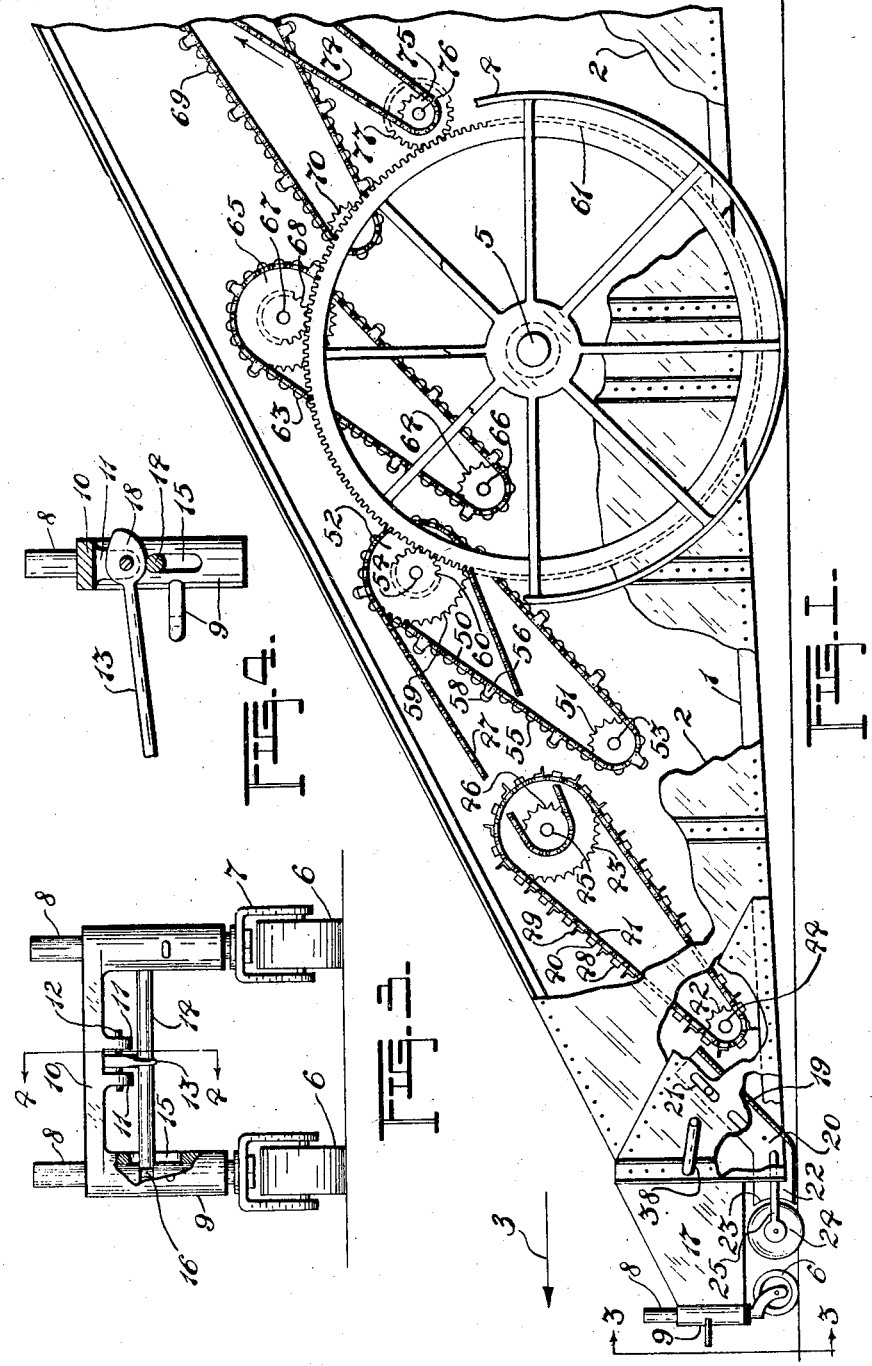

March 15, 1949. L. GREAVES 2,464,305
ROOT CROP DIGGER
Filed Feb. 15, 1945 4 Sheets-Sheet 4
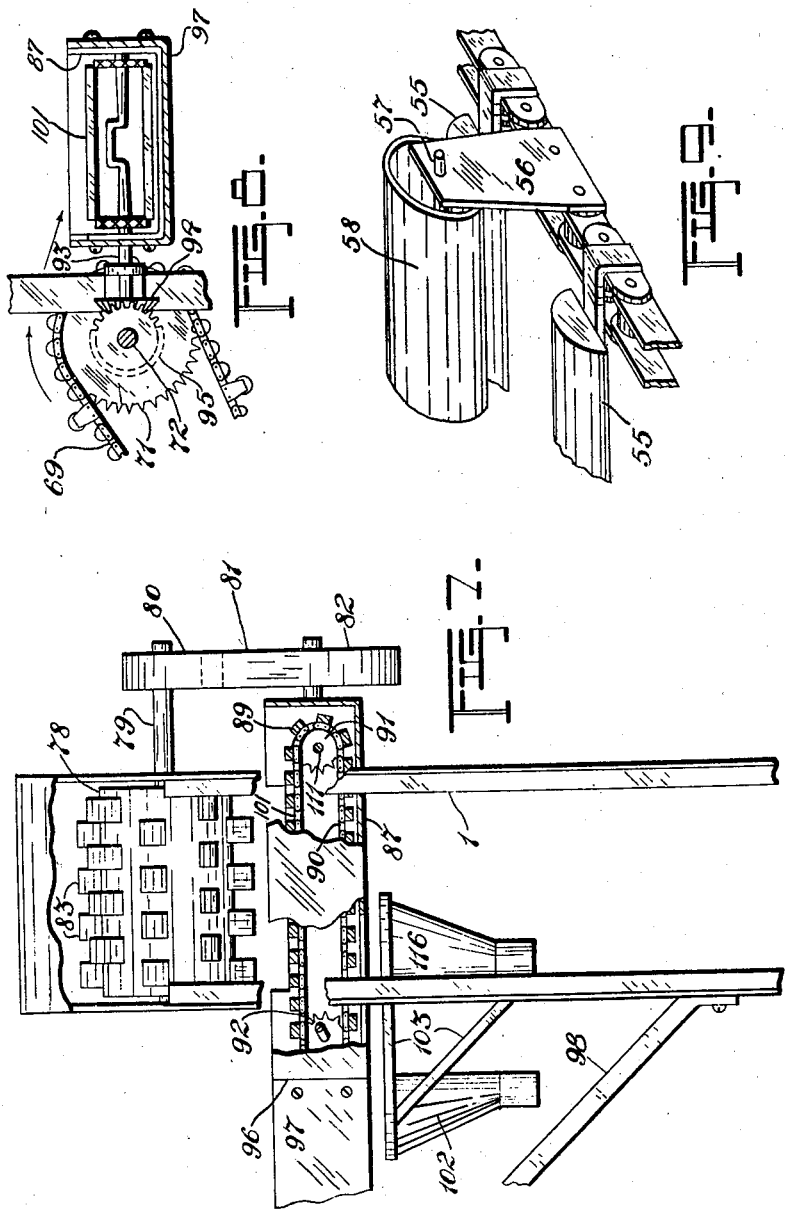
INVENTOR:
Leopold Greaves
BY:- Fetherstonhaugh & Kent
his Attys.

Patented Mar. 15, 1949

2,464,305

UNITED STATES PATENT OFFICE 2,464,305

ROOT CROP DIGGER

Leopold Greaves, Kirkfield Park, Manitoba, Canada

Application February 15, 1945, Serial No. 578,007

2 Claims. (Cl. 55—51)

My invention relates to root crop diggers, an object of the invention being to provide an implement of the character herewithin described which is primarily designed for the harvesting of potatoes, the implement being tractor drawn, and functioning to remove soil and the like from the potatoes by a tumbling action at the same time as elevating the same to an altitude such that they may be transferred to a wagon or truck moving alongside.

A further object of my invention is to provide a device of the character herewithin described from which the potatoes may be transferred to a wagon or truck as aforesaid, alternatively may be bagged, and if desired, graded and automatically bagged according to size, all while the machine is in motion harvesting potatoes in the row.

A further object of my invention is to provide a device of the character herewithin described which is of eminently simplified construction, in which all the parts are easy of access, which is easy to operate and will not readily become out of order.

With the above more important objects in view and such other minor objects as may appear as the specification proceeds, my invention consists essentially in the arrangement and construction of parts all as hereinafter more particularly described, reference being had to the accompanying drawings, in which—

Figure 1 is a side elevation but with certain parts shown in section, of the forward part of my implement.

Figure 2 is a view similar to Figure 1 showing the rear end of my implement.

Figure 3 is a front view illustrating my front end pony wheels and associated parts only and as viewed from 3—3 of Figure 1, the structure posterior to the said wheels being eliminated for simplicity.

Figure 4 is a section on the line 4—4 of Figure 3.

Figure 5 is a plan view of the front end of my root crop digger.

Figure 6 is a plan view of the rear end of my root crop digger and discharge conveyor belt.

Figure 7 is an elevation partly in section illustrating the upper end of my implement as viewed from the rear end thereof.

Figure 8 is a section on the line 8—8 of Figure 6.

Figure 9 is a perspective detail illustrating the slatted configuration of my conveying and tumbling belts.

Figure 10 is a perspective representation of my refuse removing drum.

Figure 11 is a side sectional elevation of the short oscillating grader which I may substitute for the primary discharge conveyor belt illustrated in Figure 6.

Figure 12 is a fragmentary sectional elevation illustrating the outer end of a longer oscillating potato grader which I may substitute for the grader of Figure 11 and which is intended to lie within the trough provided for the discharge conveyor belt best illustrated in Figure 6.

Figure 13 is a fragmentary sectional illustration of the reduction gearing whereby I raise and lower my subsurface blade and associated parts.

In the drawings like characters of reference indicate corresponding parts in the different figures.

My invention consists of the framework collectively designated 1 in the accompanying Figures 1, 2, 4, 5 and 6, the framework being predominantly sheathed with sheet metal 2. The device is intended to be tractor drawn in the direction of the arrow 3, and from Figure 5 will be seen to be of a narrow longitudinal configuration when viewed in plan, and of a predominently triangular configuration when viewed from the side as per Figures 1 and 2.

The framework is supported clear of the ground by the pair of ground engaging wheels 4 which are mounted on the transverse axle 5, this axle being positioned slightly to the rear of the centre of balance of the implement so that it is slightly front-end heavy as clearly illustrated from Figure 1.

The front end of the machine is supported on a pair of transversely spaced and swivelling pony wheels 6 mounted in the brackets 7, vertical shafts 8 being secured to the brackets and rotatable in a pair of vertical sleeves 9 held in spaced relationship by the crosshead 10 from the centre of which depends a bearing 11 through which a pin 12 extends to support rotatably the cam lever 13.

Positioned slightly below the crosshead 10 and parallel therewith is a shaft 14 which extends through vertical and opposed slots 15 upon the inner surfaces of the sleeve 9, the ends of the shaft 14 being receivable into annular keyways 16 formed in the shaft 8. The sleeves are integral with plates 17 extending therebehind, which plates are also secured to the front end of my framework 1, and from the foregoing it will clearly be apparent that upon rotation clockwise (with respect to the accompanying Figure 4) of my cam lever 13, the cam 18 thereof will bear against the shaft 14 and cause the sleeve 9, the crosshead 16, the plates 17 and the whole front end of my framework to be lifted so that the implement may be transported from one place to another.

Between the plates 17 is my inclining, transverse, subsurface blade 19 the advancing edge whereof is intended to be projected below ground level for the purpose of raising potatoes and other root crops to the surface. Secured to the sides of the blade 19 are shovels 20 provided with the slots 21, the front ends of the horizontal portions 22 of the shovels being arcuate as at 23 and complementary to the curvature of rolling coulters 24 which are secured in position by brackets 25 secured against the inner surface of the horizontal portion 22 of the shovels aforesaid.

By reference to the detail Figure 13, it will be seen that I provide a pair of spaced brackets 26 of double angulated configuration, the ends whereof are suitably secured to the shovels 20, a toothed rack 27 being secured centrally upon the brackets 26. This rack is acted upon to move the blade 19 and the associated parts in the directions of the arrow 28, by the pinion 29 mounted in the transverse shaft 30 the ends whereof are secured in the side plates 17. The pinion 29 is in turn acted upon by the worm gear 31 mounted upon the shaft 32 sustained in place by bearings 33 secured to the transverse brackets 34, a pinion 35 being keyed to the lower end of the shaft 32 and in mesh with a worm gear 36 mounted upon the transverse shaft 37 the outer end of which terminates in a handle 38.

The side plates 17 constitute the front end wall portions of a rearwardly and upwardly inclining open-ended channel 39, within which is positioned my rearwardly and upwardly inclining, progressively stepped conveying and tumbling system which I will now proceed to describe.

The said system comprises a series of upwardly and rearwardly inclining belts of the configuration, and operated in the manner hereinafter to be described, and considering first the foremost belt 40, the same will be seen to consist of a pair of sprocket chains 41 in mesh at the front and rear ends with pairs of sprocket wheels 42 and 43 respectively mounted upon transverse shafts 44 and 45. The shaft 45 projects upon one side of my implement (see Figure 5), and has keyed thereto a sprocket 46 in mesh with a driving sprocket chain 47.

Spanning the sprocket chains 41 and secured at the ends thereto are slats 48 of rectangular cross-section, these slats alternating with transverse pieces of angle section 49 parallel with the slats as illustrated in Figure 1 from which it will be seen that the shaft 44 is so located with respect to the underside and rear edge of my subsurface blade 19, that the belt 40 will receive potatoes crowded over the said rear edge and proceed to convey the same upwardly and rearwardly.

The second conveying belt 50 is comprised of a similar pair of sprocket chains to those of the belt 40, the chains of the belt 50 being in mesh with front and rear sprocket wheels 51 and 52 mounted on the transverse shafts 53 and 54, it being clearly recognized from the accompanying Figure 1 that the shaft and sprocket wheel assembly 51 and 53 is positioned below and to the rear of the sprocket and shaft assembly 43 and 45 to an extent such that potatoes being precipitated from off the upper rear end of the belt 40 will be picked up by the belt 50, the space between the closest proximal point of the two belts being sufficient to enable them to rotate independently of each other but insufficient to prevent the possibility of potatoes falling therebetween.

By reference to the accompanying Figure 9 it will be seen that the transverse slats of the belt 50 differ somewhat from the slats of the belt 40, and in the latter case I would explain that I provide sets of parallel and spaced slats 55 of four (or more or less) to the set, these slats being of plano-convex cross-section and secured at the ends thereof to the side chain. Separating each set however is a pair of transversely aligned and upwardly projecting brackets 56 spanning which are the rods 57, which in turn sustain in place the freely mounted light metal tubes 58. These therefore occupy a plane above the plane of the sets of slats 55 and function as barriers against those potatoes or the like which tumble from the slats 55 during movement of the associated belt.

The shaft 54 projects upon one side of the machine and has keyed thereto a sprocket wheel 59 which drives the aforesaid chain 47, and, at the outer end thereof a pinion 60. This pinion is in mesh with and driven by a large king pinion 61 freely mounted upon the shaft 5, a clutch mechanism 62 being positioned between the pinion 61 and the adjacent ground wheel 4, by the operation of which the former may be disconnected from the latter when the implement is being transported from one place to another, at which time obviously, it will not be desired that my series of belts should be in operation.

The third conveyor belt 63 will preferably have a system of transverse slats similar to the belt 50, and is tensioned between the sprocket wheels 64 and 65, mounted upon the shafts 66 and 67 respectively, the former occupying the same relationship to the shaft 54, as the shaft 53 bears with relation to the shaft 45 and which has already been discussed.

The shaft 67 projects and terminates in the pinion 68 which is also in mesh with the king pinion 61, the belt 63 therefore being driven directly by this means.

To the rear of the belt 63 is a fourth conveyor belt 69 which, it will be noticed is somewhat less steeply inclined than are the belts in advance thereof, the slats of the belt 69 being preferably similar to those of the belts 50 and 63. Belt 69 is tensioned between the pairs of sprocket wheels 70 and 71, the latter being mounted on the transverse shaft 72 which projects upon each side of the framework as will be seen by reference to Figure 6, and has keyed to one of the outer ends thereof, a sprocket wheel 73 in mesh with the chain 74 which is driven by the wheel 75 keyed to the end of counter-shaft 76, on which is also keyed a pinion 77 in mesh with the king pinion 61.

Above and to the rear of the pinion and shaft assembly 71 and 72 is a refuse removing roller 78 mounted upon the shaft 79, which also projects upon one side of my framework and has keyed to the end thereof a pulley 80 over which passes the belt 81, driven from a pulley 82 keyed to the opposite end of the shaft 72 to that to which the sprocket wheel 73 is keyed.

The drum 78 rotates in a clockwise direction with respect to the accompanying Figure 2, and has provided thereon aligned sets of staggered refuse pickers 83 of the configuration clearly illustrated, the proximity of the outer ends of these pickers with relation to the slats of the belt 69 being such that potatoes may pass clearly from off the rear end of the latter onto the discharge conveyor belt which I will describe hereinafter, while refuse such as weeds, stalks and the like will be engaged by the pickers and thrown rearwardly as indicated by the arrow 84 into the hood 85 and from thence downwardly through the refuse chute 86 onto the ground. In this way refuse will be deposited immediately to the rear of my implement in rows, without being scattered all over the field being harvested.

Positioned at right angles to the channel 39 at the rear end of the implement and secured to the framework as best illustrated in the accompanying Figures 2, 6, 7 and 8 is a trough 87 in which is positioned the horizontal lying discharge conveyor belt 88 which also comprises spaced and parallel slats 89, in this instance of rectangular cross-section and secured at the ends thereof upon a pair of sprocket chains 90, the belt being tensioned between pairs of sprocket wheels 91 and 92, the wheels 92 being keyed to a drive shaft 93 to the projecting end of which is also keyed a bevelled pinion 94. This pinion is in mesh with a pinion 95 keyed medially upon the length of the projecting portion of the shaft 72.

Attachable to the open end 96 of the trough 87 is a longer trough 97 supported by the diagonal braces 98, and being provided at the far end 98' thereof with a transverse shaft 99 having a pair of sprocket wheels 100 mounted thereon. Therefore, when it is desired that potatoes which have been harvested shall be precipitated into a truck or wagon moving alongside my implement, I would explain that a longer conveyor belt 101 is substituted for the belt 88 which is detached, the belt 101 extending from the pair of sprocket wheels 91 to the pair 100 and being driven by the pair of wheels 92. Potatoes now being harvested will tumble off the open end 98 instead of falling through the bagger 102 supported upon one side of the framework by means of the brackets 103. This bagger is of course of conventional construction and need not therefore be described in detail.

In substitution of the belts 88 and 101, I may if desired provide the oscillating grader boards 104 or 105 illustrated in Figures 11 and 12, these boards being of conventional construction and having a corrugated surface 106 having apertures 107 therein through which potatoes of less than a given size may be precipitated onto a chute 108 integral with the boards 104 or 105. The boards, of whichever length it is desired to employ, are provided upon the rear edge with the sideboards 109, and by reference to Figure 11, it will be seen that one end of the board is secured by means of the link 110 to the sprocket shaft 111, a connecting rod 112 extending between a hinge 113 on the underside of the board and a cranked portion 114 formed centrally of the shaft 87 upon the shaft 93. Accordingly, upon rotation of the shaft 93, it is clear that the board will oscillate so as to grade the potatoes and cause them to move leftwardly with respect to the accompanying Figure 11, the board being slightly inclined downwardly towards the left. The graded potatoes then fall through onto the chute 108 and from thence through the aperture 115 through the bagger 116, while the ungraded potatoes tumble over the open end of the chute 87 through the bagger 102 aforesaid.

In the event that it is desired that the potatoes should proceed into a truck or wagon travelling alongside my implement, the trough 97 will be attached, together with the grading board 105 which is secured at the right hand end thereof in the manner I have described in connection with the board 104, the board 105 being similarly oscillated. The left hand end however is provided with the strap 117 which secures the board slidably to the shaft 99, and upon oscillation of this board, it is clearly to be understood that potatoes will tumble off the left hand end thereof into the truck or wagon while the graded potatoes will gravitate through the open end 118 of the trough into another compartment in the wagon or truck, or if desired, through a bagger secured in any conventional way to the trough.

From all the foregoing, it will be recognized that as my implement moves forwardly, with the king pinion 61 in clutched engagement with the drive wheel 4, the several conveying belts which I have described will travel clockwise with respect to the accompanying Figure 1 and convey the potatoes rearwardly and upwardly at the same time subjecting them to a tumbling action which has the effect of cleaning the same of soil and the like, and in this connection, it is to be understood that I will preferably so gear the several belts that they will move at considerable speed in order that there may be substantial slippage and tumbling action. In other words, the potatoes will not be positively conveyed upwardly and rearwardly at the same rate as the belts are travelling.

To summarize the sequence of operation of the several belts, it will be recognized that belt 40 is driven by the sprocket wheel 46 from the chain 47 which is in mesh with sprocket wheel 59 keyed to the shaft 54 and driven by the pinion 60 from the king pinion 61. Belt 50 is also driven from the shaft 54 to which the pair of sprocket wheels 59 are keyed while belt 63 is driven by pinion 68 which is keyed to shaft 67, to which, in turn, the pair of drive sprocket wheels 65 are also keyed in this instance.

Belt 69 is driven by pinion 77 keyed via the shaft 76 to the sprocket wheel 75 which in turn is in mesh with chain 74, chain 74 in turn meshing with sprocket wheel 73 keyed upon the shaft 72 to which the pair of sprocket wheels 71 are also keyed to drive the belt 69 aforesaid.

Rotation of the remaining parts is self-apparent from a consideration of the accompanying Figures 2 and 6, and since various modifications can be made in the invention herein described and since the accompanying drawings have been prepared only to illustrate the relative arrangement and interaction of parts and not with regard to accuracy of dimensions for manufacturing purposes which in view of this disclosure I consider to entail merely mechanical skill together with the skill of the mechanical draftsman, and since many apparently widely different embodiments of this invention may be made within the scope of the accompanying claims without departing from the spirit and scope of the same it is intended that all matter contained in the accompanying specification shall be interpreted as illustrative only and not in a limiting sense and I desire only such limitations placed thereon as justice dictates.

What I claim as my invention is:

1. A root crop digger comprising in combination a longitudinal framework supported on a pair of ground engaging wheels in a state of slight front end overbalance, a pair of pony wheels on the front end of said framework, a rearwardly and upwardly inclining, progressively stepped conveying and tumbling system within said framework, said conveying and tumbling system being positioned in an upwardly and rearwardly inclining open-ended channel and comprising a plurality of separate, upwardly and rearwardly inclining belts, a refuse picking drum at the rear end of said conveying and tumbling system, a hood extending at least partially over said drum, a downwardly extending refuse chute at the rear of said framework, said hood being coterminous with said chute, a transverse subsurface blade at the front end of said channel, and a discharge conveyor at the rear end of said system at right angles thereto.

2. A root crop digger comprising in combination a longitudinal framework supported on a pair of ground engaging wheels in a state of slight front end overbalance, a pair of pony wheels on the front end of said framework, a rearwardly and upwardly inclining, progressively stepped conveying and tumbling system within said framework, said conveying and tumbling system being positioned in an upwardly and rearwardly inclining open-ended channel, and comprising a plurality of separate, upwardly and rearwardly inclining belts, at least one of said belts being comprised of a plurality of transverse, spaced and parallel slats of plano-convex cross section and a pair of transversely aligned, upwardly projecting brackets at intervals on said belt, tubes spanning said brackets in a plane above that of said slats for the purpose specified, a transverse subsurface blade at the front end of said channel, and a discharge conveyor at the rear end of said system at right angles thereto.

LEOPOLD GREAVES.

REFERENCES CITED

The following references are of record in the file of this patent:

UNITED STATES PATENTS

| Number | Name | Date |
|---|---|---|
| 109,389 | Corwin | Nov. 22, 1870 |
| 622,072 | Pratt | Mar. 28, 1899 |
| 789,839 | Colgrove | May 16, 1905 |
| 890,548 | Wolf | June 9, 1908 |
| 1,107,965 | Klinghammer | Aug. 18, 1915 |
| 1,169,673 | Peebles | Jan. 25, 1916 |
| 1,816,999 | Ensminger | Aug. 4, 1931 |
| 2,209,282 | Rodin | July 23, 1940 |

FOREIGN PATENTS

| Number | Country | Date |
|---|---|---|
| 79,336 | Hungary | Oct. 4, 1922 |